(12) United States Patent
Brandl et al.

(10) Patent No.: US 7,694,599 B2
(45) Date of Patent: Apr. 13, 2010

(54) GEARING AS WELL AS A ROTARY ENCODER EQUIPPED WITH SUCH GEARING

(75) Inventors: Alois Brandl, Siegsdorf (DE); Johann Mitterreiter, Chieming (DE); Michael Schwabe, Überlingen (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 1621 days.

(21) Appl. No.: 10/504,825

(22) PCT Filed: Jan. 22, 2003

(86) PCT No.: PCT/EP03/00574

§ 371 (c)(1),
(2), (4) Date: Aug. 16, 2004

(87) PCT Pub. No.: WO03/069281

PCT Pub. Date: Aug. 21, 2003

(65) Prior Publication Data

US 2005/0161304 A1 Jul. 28, 2005

(30) Foreign Application Priority Data

Feb. 16, 2002 (DE) ............................... 102 06 543

(51) Int. Cl.
*F16H 1/18* (2006.01)
*H03M 1/22* (2006.01)
*H02K 49/00* (2006.01)
*H02P 15/00* (2006.01)

(52) U.S. Cl. .................. 74/424.5; 341/15; 310/103

(58) Field of Classification Search ................ 74/424.5; 73/862.339, 862.08, 861.94; 310/103, 99, 310/92, 96, 104; 33/1 SP; 341/15
See application file for complete search history.

(56) References Cited

U.S. PATENT DOCUMENTS

| 1,422,000 A | 7/1922 | Schmick |
| 2,243,555 A * | 5/1941 | Faus ........................... 310/103 |

(Continued)

FOREIGN PATENT DOCUMENTS

| DE | 24 26 125 | 12/1975 |

(Continued)

OTHER PUBLICATIONS

Calvert, Iron: The metal of Mars goves us magnetism and life, http://mysite.du.edu/~jcalvert/phys/iron.htm, p. 9/13, 2002.*

*Primary Examiner*—Thomas R Hannon
*Assistant Examiner*—Justin Krause
(74) *Attorney, Agent, or Firm*—Kenyon & Kenyon LLP

(57) ABSTRACT

A gear mechanism includes a rotating input element, a rotating output element, and at least one first force transmission device arranged along a spiral line on a face of the input element. A second force transmission device is arranged along an encircling line on a face of the output element. The interaction of these force transmission devices transmits a turning moment from the input element to the output element, whereby this turning moment effects a rotating motion in the output element so that the rotational speed is lower than the rotational speed of the input element. A rotary encoder may be equipped with a gear mechanism of the aforementioned type.

39 Claims, 13 Drawing Sheets

U.S. PATENT DOCUMENTS

| | | | | |
|---|---|---|---|---|
| 2,295,998 | A * | 9/1942 | Maxson et al. | 74/1 R |
| 2,405,473 | A * | 8/1946 | Valentine | 74/424.5 |
| 3,814,962 | A * | 6/1974 | Baermann, Max | 310/103 |
| 5,569,967 | A * | 10/1996 | Rode | 310/103 |
| 6,054,788 | A * | 4/2000 | Dombrovski et al. | 310/103 |
| 6,089,116 | A | 7/2000 | Siraky | |
| 6,542,088 | B1 | 4/2003 | Bielski et al. | |
| 7,148,594 | B2 * | 12/2006 | Rajasingham | 310/75 C |

FOREIGN PATENT DOCUMENTS

| | | |
|---|---|---|
| DE | 197 45 177 | 5/1999 |
| DE | 198 20 014 | 11/1999 |
| JP | 53-46560 | 4/1978 |
| JP | 3-107658 | 5/1991 |
| JP | 4-105544 | 4/1992 |
| JP | 4-127867 | 4/1992 |
| JP | 4-131555 | 5/1992 |

* cited by examiner

GEARING AS WELL AS A ROTARY ENCODER EQUIPPED WITH SUCH GEARING

FIELD OF THE INVENTION

The present invention relates to a gearing and to a rotary encoder equipped with such gearing.

BACKGROUND INFORMATION

In addition to angle-measuring instruments, which allow an angle measurement at a rotatable shaft in incrementable measuring steps, so-called absolute angle-measuring instruments—also referred to as rotary encoders—are conventional as well. These allow an absolute angle determination within a single shaft rotation. Furthermore, if the number of performed shaft rotations is to be recorded as well, so-called multiturn rotary encoders are generally utilized. With such multiturn rotary encoders, the absolute angular position is determined within one shaft rotation, i.e., between 0° and 360°, via a code disk connected to the shaft, which is scanned with the aid of a suitable photoelectric scanning unit. To obtain the required information regarding the number of effected shaft rotations, a reduction or step-down gear is typically provided, via which one or more additional graduated disks or code disks is/are set into a rotary motion having a low number of revolutions per unit of time, while the shaft is rotating. These code disks are often designed as magnetized disks, each having at least one north-pole and one south-pole sector. The rotational position of these additional code disks is normally recorded in a conventional manner with the aid of suitable scanning units, in particular Hall sensors. Due to the specified reduction of the rotary motion of the additional code disks, it is possible to ascertain the number of effected rotations of the shaft in this manner. A measurement of the absolute position of the driven shaft may thus be carried out also over a plurality of rotations.

It may be advantageous in such reduction gearings if the first reduction step utilizes the highest possible reduction ratio so that the gear wheels of the subsequent gearing steps rotate at an already considerably lower rotational frequency. This significantly reduces the loading of the subsequent gear steps.

A similarly configured multiturn rotary encoder is described in German Published Patent Application No. 198 20 014, of the applicant hereof. This describes an integrated construction method for electronic components of rotary encoders.

German Published Patent Application No. 197 45 177 describes a gearing system in which permanently magnetic or ferromagnetic, spiral-shaped segments are arranged along the peripheral areas of a drive gear and an output gear. This design may be disadvantageous insofar as it requires relatively large installation space, in particular as far as the outer dimensions in the radial direction are concerned.

The demand for rotary encoders having smaller structural dimensions continues to grow. Since the electronic components of rotary encoders are integrated to an ever greater extent and are thus miniaturized as well, the installation space for the mechanical components of these devices often becomes a limiting factor in such miniaturization endeavors.

SUMMARY

An example embodiment of the present invention may provide a gearing that has small structural dimensions and may be produced at low cost.

The gearing may be used in a rotary encoder.

In an example embodiment of the present invention, a very high reduction ratio may be achieved by the gearing, and the outer diameter of the entire rotary encoder may be kept small at the same time. Furthermore, the installation space required in the axial direction may be comparatively low. In addition, the gearing according to an example embodiment of the present invention may have a relatively low mass inertia, which may be advantageous especially with high dynamic changes in rotary motions.

In the following text, the end face of the drive or output element should be understood as an area that is substantially perpendicular to its axis of rotation. In a circular-cylindrical drive or output element, the end face should thus not be understood as the lateral surface but as one of the circular or ring surfaces.

The force-transmission arrangement of the gearing may be configured as permanent magnets. The permanent magnets are arranged on the drive gear along a spiral line and the permanent magnets on the output element are arranged along a circular curve, for instance. The action of the gearing may be improved if the spiral line on the drive element is configured as part of an Archimedean spiral. To increase the magnetic forces, the bodies of the drive gear and the output gear to which the permanent magnets are affixed may be made of a material having high relative permeability, which, as a minimum, exceeds the value 10 and is greater than 100, for example.

According to an example embodiment of the present invention, a gearing includes: a rotatable drive element; a rotatable output element; at least one first force-transmission device arranged at an end face of the drive element along at least one spiral line; and a second force-transmission device arranged at an end face of the output element along a circumferential line. In accordance with reciprocal action of the first force-transmission device and the second force-transmission device, the first force-transmission device and the second force-transmission device are configured to transmit torque from the drive element to the output element to effect a rotary motion in the output element. A frequency of rotation of the output element is lower than a frequency of rotation of the drive element.

According to an example embodiment of the present invention, a rotary encoder includes at least one gear step. Each gear step includes: a rotatable drive element; a rotatable output element; at least one first force-transmission device arranged at an end face of the drive element along at least one spiral line; and a second force-transmission device arranged at an end face of the output element along a circumferential line. In accordance with reciprocal action of the first force-transmission device and the second force-transmission device, the first transmission device and the second transmission device are configured to transmit torque from the drive element to the output element to effect a rotary motion in the output element, and a frequency of rotation of the output element is lower than a frequency of rotation of the drive element.

According to an example embodiment of the present invention, a gearing includes: rotatable drive means; rotatable output means; at least one first force-transmission means arranged at an end face of the drive means along at least one spiral line; and second force-transmission means arranged at an end face of the output means along a circumferential line. In accordance with reciprocal action of the first force-transmission means and the second force-transmission means, the first force-transmission means and the second force-transmission means transmit torque from the drive means to the output means to effect a rotary motion in the output means, and a frequency of rotation of the output means is lower than a frequency of rotation of the drive means.

According to an example embodiment of the present invention, a rotary encoder includes at least one gear step. Each gear step includes: a rotatable drive means; a rotatable output means; at least one first force-transmission means arranged at an end face of the drive means along at least one spiral line; and a second force-transmission means arranged at an end face of the output means along a circumferential line. In accordance with reciprocal action of the first force-transmission means and the second force-transmission means, the first force-transmission means and the second force-transmission means transmit torque from the drive means to the output means to effect a rotary motion in the output means, and a frequency of rotation of the output means is lower than a frequency of rotation of the drive means.

Further details and aspects of the gearing and a rotary encoder provided therewith are set forth in the following description of exemplary embodiments with reference to the appended Figures.

DETAILED DESCRIPTION

Equally acting components of different exemplary embodiments are provided with identical reference signs in the Figures.

Figure 1A:
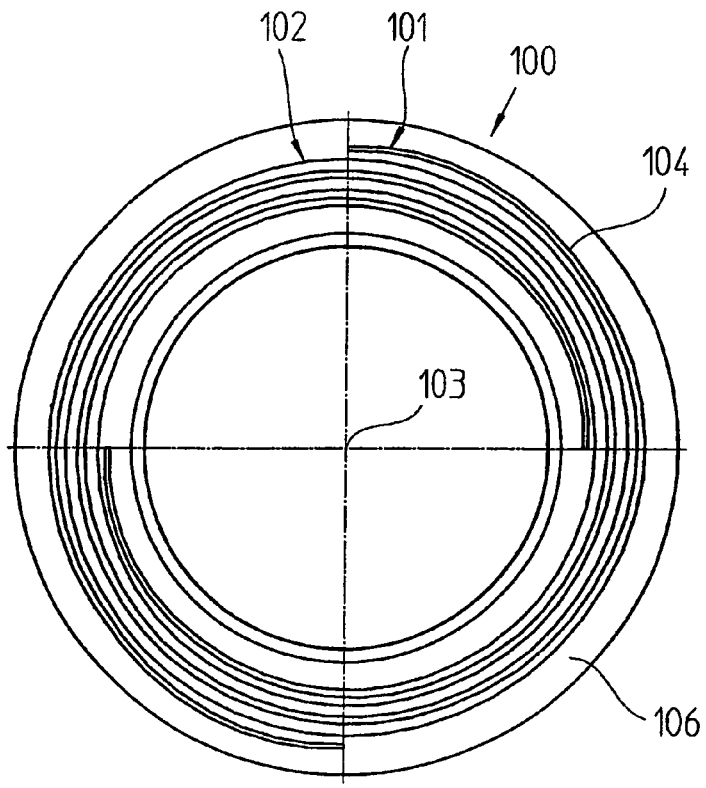
FIG. 1a is a plan view of the drive gear having permanent magnets.
Figure 7:
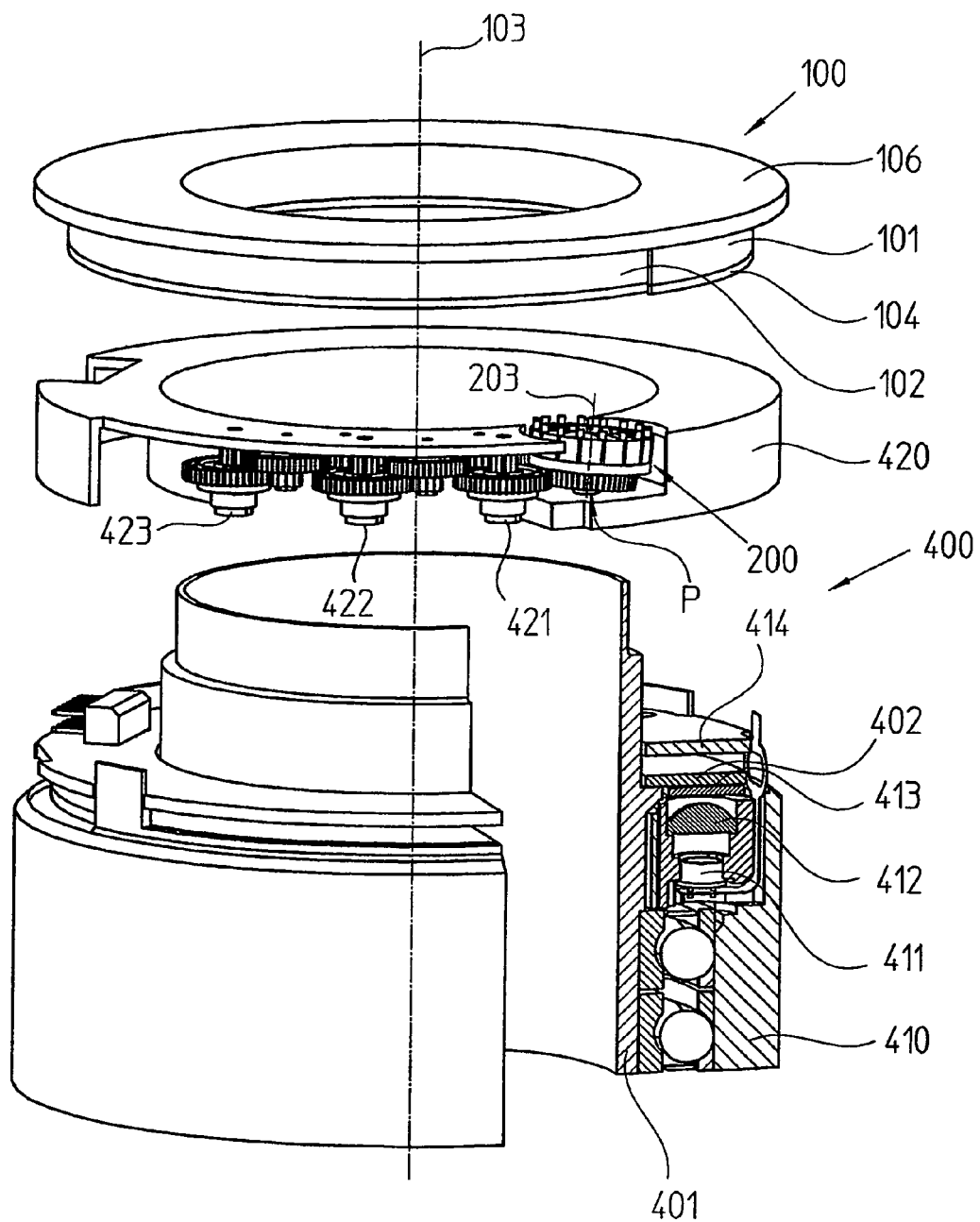
FIG. 7 is a spatial exploded representation of a rotary encoder with partial sections.

FIG. 1a is a plan view of drive gear 100 of the gearing according to an example embodiment of the present invention as it is installed as first gear step in a rotary encoder 400 (FIG. 7). Drive gear 100 has a large central bore to accommodate a hollow shaft 401 (shown in FIG. 7), the rotational position of which is measured during operation of rotary encoder 400. At a front end of drive gear 100, aligned along a spiral curve in each case, are two longitudinal permanent magnets 101, 102 (FIG. 1b), which are arranged at a 180° offset, arranged on top is a spiral-shaped plate 104, the edges of which extend according to the form of permanent magnets 101, 102. Plate 104 is bonded to permanent magnets 101, 102. Plate 104 is made of a ferromagnetic alloy, so that the magnetic field of permanent magnets 101, 102 is intensified. Body 106 of drive gear 100 is made of a ferromagnetic FeNi alloy, which has a relative permeability $\mu_r$ of at least 10, and, e.g., of 1000. In the example illustrated, $\mu_r$ is approximately 3000.

In this exemplary embodiment, the spiral curve is configured as part of an Archimedean spiral according to the equation $r = a \cdot \phi$, r representing the radius of the spiral and a representing a constant positive number. $\phi$ should be understood to represent the pivoting angle (in radians) of a radial beam about the pole of the spiral curve. Since the spiral in the illustrated example is centrically arranged with respect to drive gear 100, the pole is located on axis of rotation 103. In this type of spiral, two consecutive intersections of an arbitrary beam originating from the pole of the spiral have the same spacing, namely $2 \cdot \phi \cdot a$.

Permanent magnets 101, 102 and plate 104 are of different thickness in the radial direction, the thinnest regions being at the beginning and the end of permanent magnets 101, 102 or plate 104.

Figure 1B:
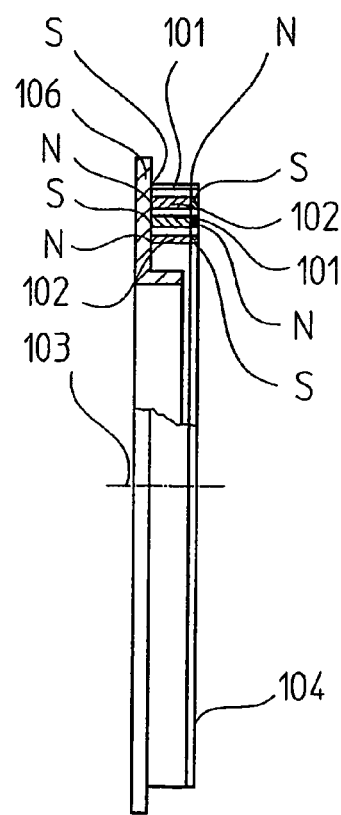
FIG. 1b is a side view with a partial section of the drive gear having permanent magnets.

As illustrated in FIG. 1b, permanent magnets 101, 102 are magnetized in the axial direction with respect to drive gear 100, which means that the connecting line between north pole and south pole of a permanent magnet 101, 102 extends substantially in parallel to axis of rotation 103 of drive gear 100. The two spiral-shaped permanent magnets 101, 102 are arranged such that in one permanent magnet 101 the south pole is facing body 106 of drive gear 100, and in the other permanent magnet 102 it is the north pole.

Figure 1C:
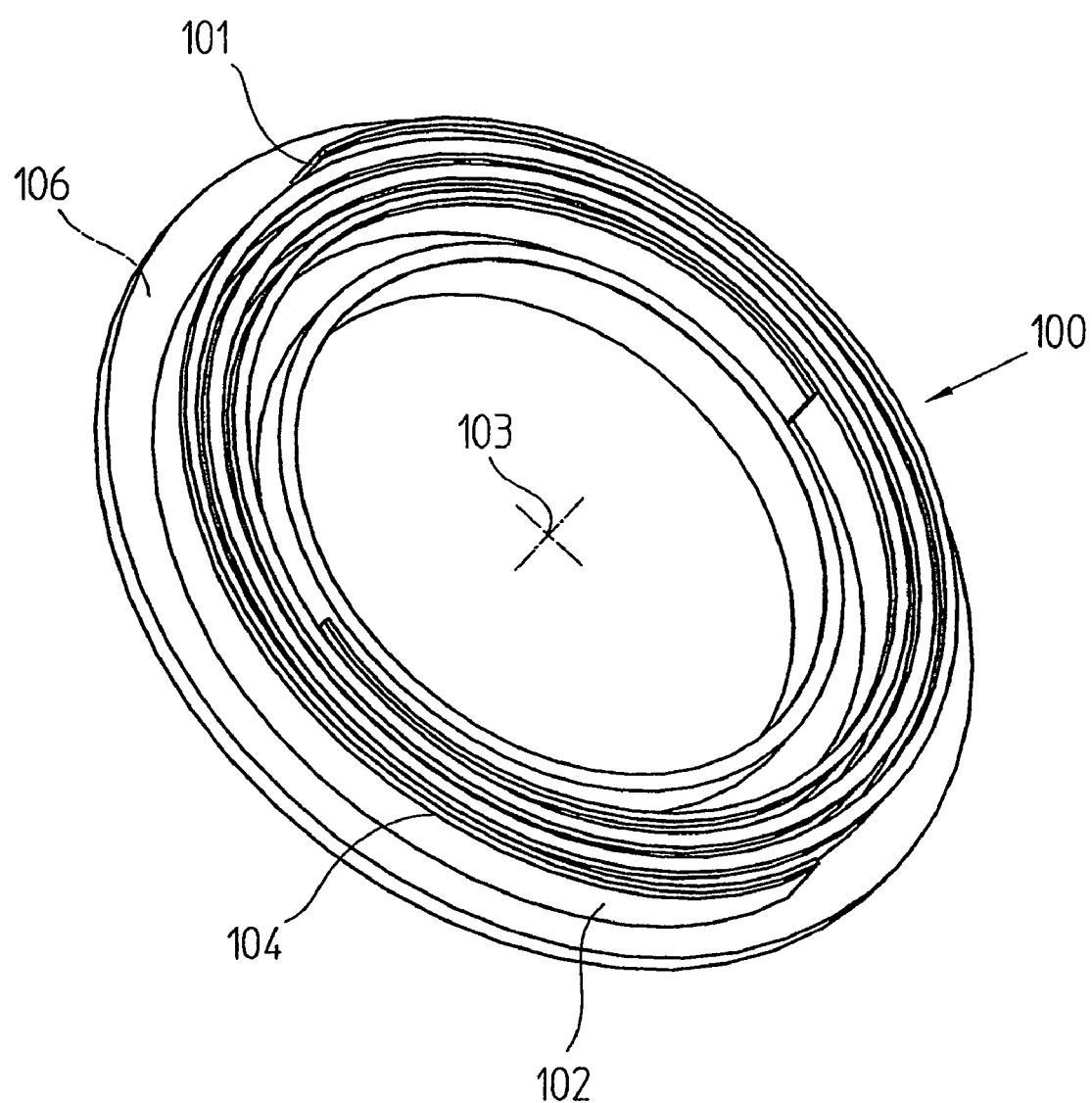
FIG. 1c is a perspective view of the drive gear.

FIG. 1c illustrates drive gear 100 with permanent magnets 101, 102 and plate 104 in a perspective illustration.

Figure 2A:
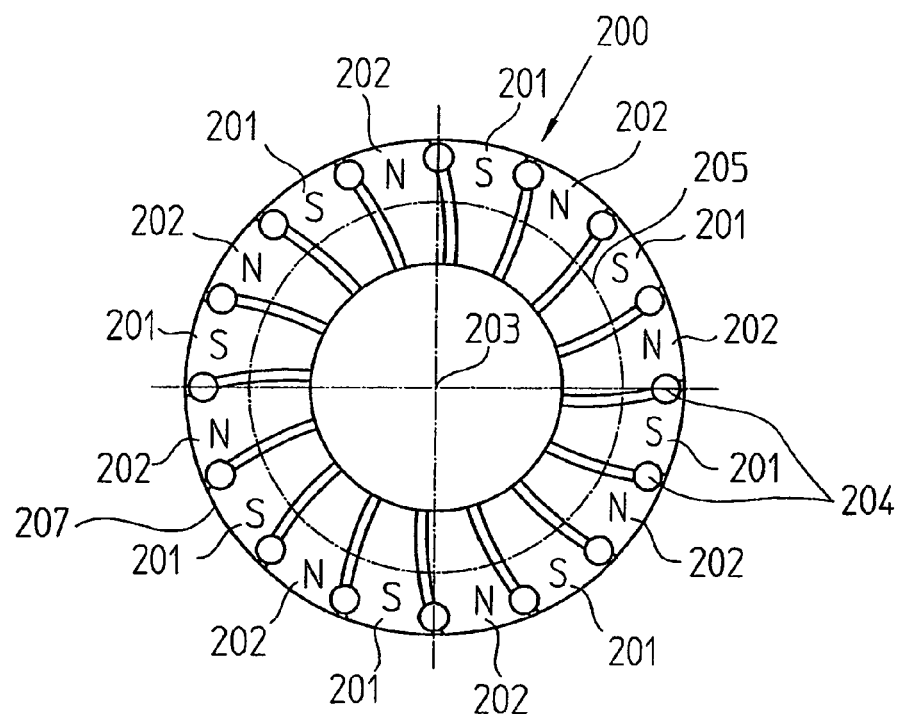
FIG. 2a is a plan view of the output gear with permanent magnets and driving pins.
Figure 2B:
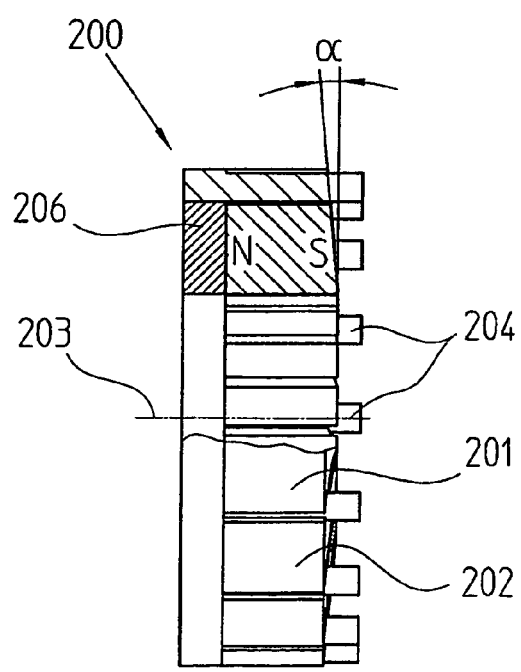
FIG. 2b is a side view including a partial section of the output gear with permanent magnets and driving pins.
Figure 2C:
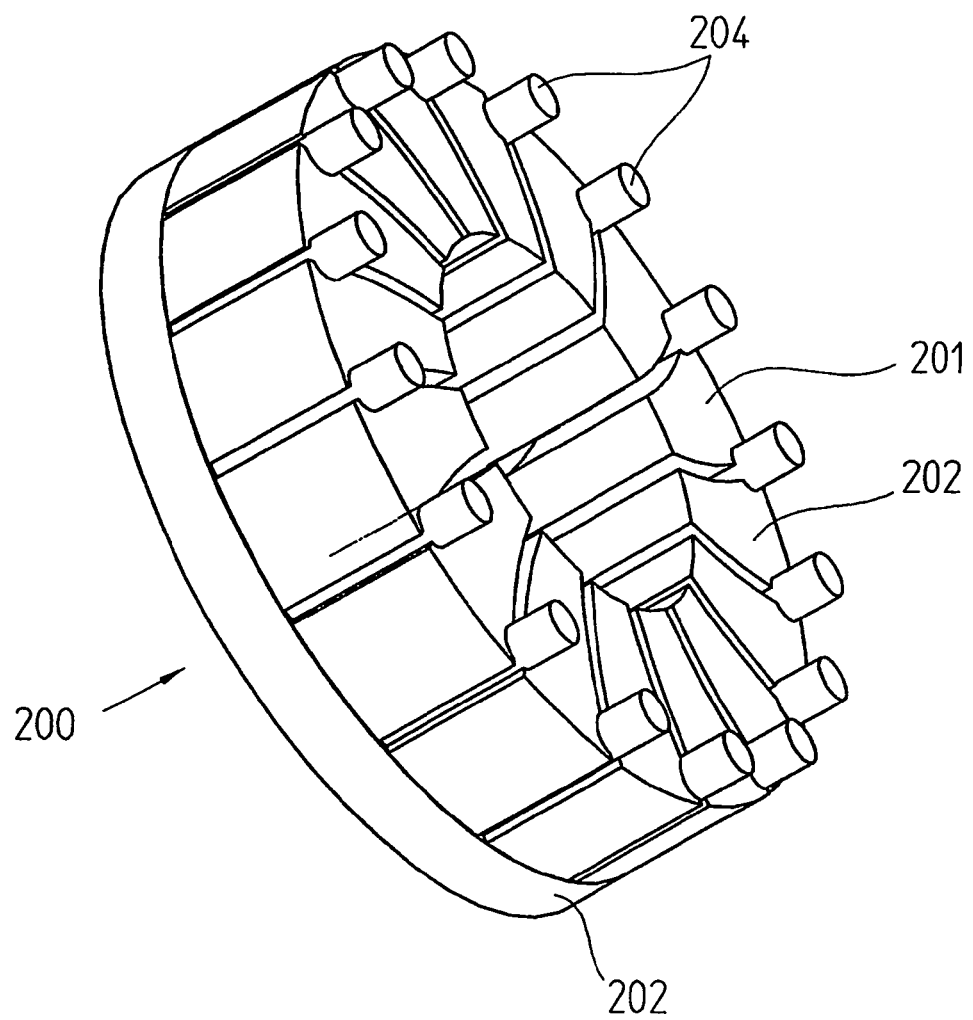
FIG. 2c is a perspective view of the output gear with permanent magnets and driving pins.

As illustrated in FIGS. 2a, 2b, and 2c, output gear 200 also includes permanent magnets 201, 202, which are arranged along a circular line 205 at the end face of output gear 200. As an alternative to a circular line 205, permanent magnets 201, 202 may also be arranged along an ellipsis, for example. Permanent magnets 201, 202 may be placed along a circumferential line, which means that a virtual beam, originating from axis of rotation 203 and directed radially outwardly, intersects the circumferential line in every angular position between 0° and 360°. The edge regions of the end faces of permanent magnets 201, 202 are beveled in a radially outward direction with respect to axis of rotation 203, at an angle α, which is 5° in this example (FIG. 2b). Permanent magnets 201, 202 are bonded to body 206 of output gear 200, which is made of a ferromagnetic FeNi alloy and has a relative permeability $\mu_r$ of at least 10 and, e.g., of 1000 as in the case of drive gear 100. In the illustrated example, $\mu_r$ is also approximately 3000. This comparatively high relative permeability may significantly intensify the magnetic field.

Permanent magnets 201, 202 are magnetized in the axial direction (relative to axis of rotation 203 of output gear 200) and aligned such that two adjacent permanent magnets 201, 202 exhibit opposing magnetization in each case. This means that the north pole of permanent magnet 201 points in the direction of body 206 of output gear 200, whereas it is the south pole in adjacent permanent magnet 202. So-called driving pins 204, made of aluminum, are arranged on output gear 200 between permanent magnets 201, 202.

Figure 2D:
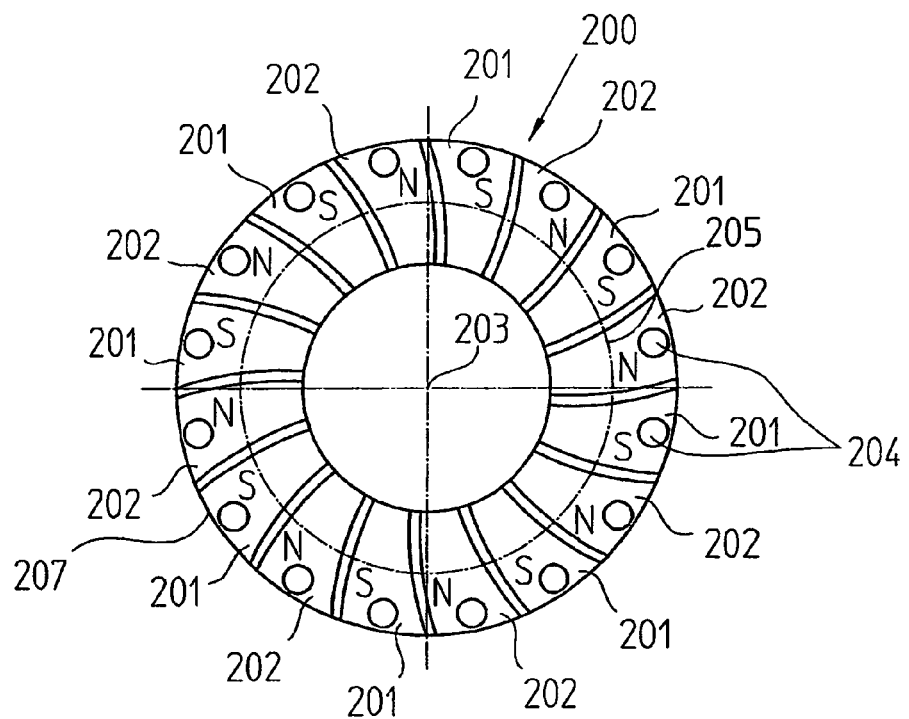
FIG. 2d is a plan view of the output gear with driving pins arranged inside the permanent magnets.
Figure 2E:
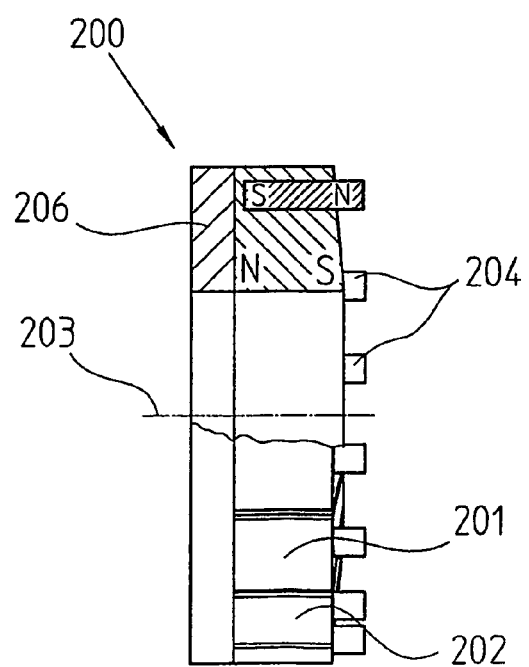
FIG. 2e is a side view including a partial section of the output gear with driving pins arranged inside the permanent magnets.

As an alternative, driving pins 204, instead of being arranged between permanent magnets 201, 202, may be arranged inside permanent magnets 201, 202, rotationally offset by one-half of a pole distance, as illustrated in FIGS. 2d and 2e. Driving pins 204 are made of a magnetizable material and magnetized themselves as well, having the same alignment and polarity as permanent magnets 201, 202.

As an alternative to driving pins 204 in the form of separate components, driving pins 204 may be monolithically integrated within permanent magnets 201, 202 by appropriate shaping of the permanent magnets.

Figure 3A:
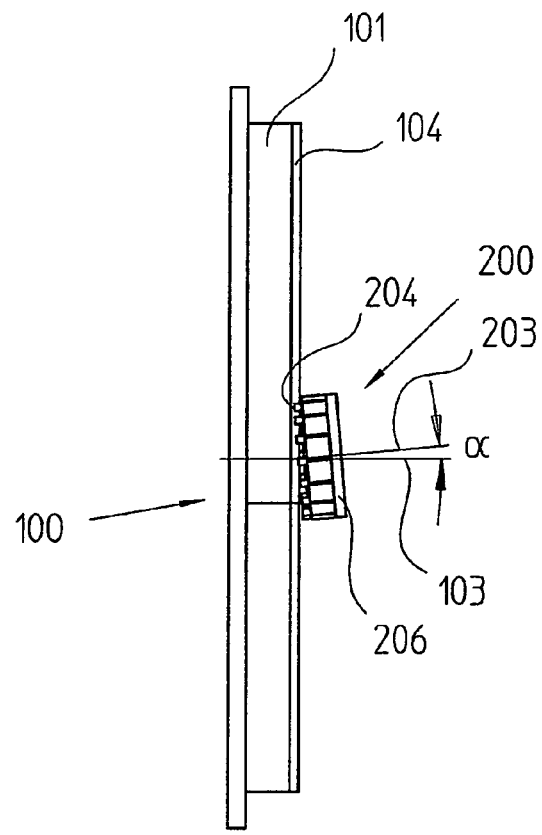
FIG. 3a is a side view of the drive gear and the output gear in the operating position.

FIG. 3a illustrates drive gear 100 in its operation-appropriate position relative to output gear 200. During operation, axis of rotation 103 of drive gear 100 and also axis of rotation 203 of output gear 200 are stationary. Due to the fact that axis of rotation 203 of output gear 200 is inclined at an angle $\alpha$ (=5°) with respect to axis of rotation 103 of drive gear 100, the front-side spacing between drive gear 100 and output gear 200 is of different size depending on the location. Consequently, the magnetic forces between permanent magnets 101, 102 of drive gear 100 and permanent magnets 201, 202 of output gear 200 are of different magnitude as well, depending on the clearance or the air gap. Furthermore, driving pins 204 are free in the region of the large clearance, which means that their ends do not project into the gaps of spiral-shaped plate 104 in this region.

Figure 3B:
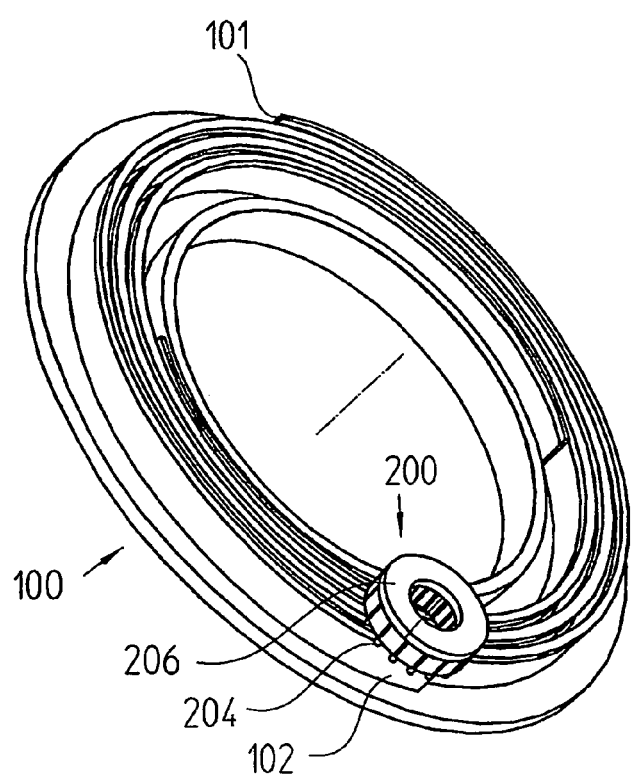
FIG. 3b is a perspective view of the gearing with permanent magnets and tilted output axle as well as driving pins.

FIG. 3b is a perspective partial view of the gearing with drive gear 100 and output gear 200 in the operating position. If drive gear 100 is set in motion, the north pole of permanent magnet 201 virtually "catches" the south pole of permanent magnet 201 of output gear 200 as soon as a sufficiently small air gap or clearance comes about between the poles of permanent magnets 101, 201 of drive gear 100 and output gear 200. In this manner, a force transmission is achieved from drive gear 100 to output gear 200. Due to the fact that bodies 106, 206 of drive gear 100 and output gear 200 are made of a NiFe alloy, which has a relative permeability $\mu_r$ of approximately 3000, the magnetic field and thus the transmittable force may be intensified or increased. Furthermore, this effect may be reinforced by ferromagnetic, e.g., magnetically hard sheet 104, which may lead to a field concentration, which may increase the force yield further. Since the rotary motion about axis of rotation 103 of spiral-shaped permanent magnet 101 has a directional component, which has a tangential orientation with respect to output gear 200, a torque going out from drive gear 100 is introduced into output gear 200. The force transmission essentially occurs into the region in which a small air gap prevails. Due to the tilting at angle $\alpha$, it may be ensured that the sum of all magnetic forces between permanent magnets 101, 201 of drive gear 100 and output gear 200 triggers a rotary motion. Since the thickness is uneven in the radial direction of permanent magnet 101 and plate 104 at the beginning and end of permanent magnet 101, the threading procedure of driving pins 204 into the clearance between the spiral lines may be improved.

The reduction ratio of the gearing depends on the number of threads of the spiral line along which permanent magnet 101 extends, on the one hand, and on the number of permanent magnets 201 of output gear 200 able to be brought into operative connection therewith, on the other hand. In the example illustrated, permanent magnet 101 is aligned along a one-gear spiral line, its north pole pointing to output gear 200. The number of associated south poles or the number of corresponding permanent magnets 201 of output gear 200 is eight. Since the reduction is the quotient of the number of threads of the spiral line and the number of permanent magnets 201 of output gear 200 in reciprocal action thereto, a reduction of 8:1 results in this case. This means that output gear 200 rotates eight times more slowly than drive gear 100 during operation.

To optimize the force yield and the synchronism of the gearing, the form of the spiral line of permanent magnet 101 is adapted to the arrangement of permanent magnets 201. Since the spiral line along which permanent magnet 101 is aligned is configured as Archimedean spiral, the constant clearance between the spiral lines is given as $2 \cdot \pi \cdot a$ as explained earlier. In the example shown, $2 \cdot \pi \cdot a = 4.4$ mm, or $a \approx 0.7$ mm.

The eight permanent magnets 201 of output gear 200 are arranged along a circular curve 205, so that a circular area is able to be formed by extending outer contour 207 of permanent magnets 201. The clearances between permanent magnets 201 are adapted to the variable $2 \cdot \pi \cdot a = 4.4$ mm, e.g., such that one north pole is "caught" by one south pole in every operating position. Expressed in geometrical terms this means that an equilateral octagon having an edge length of $2 \cdot \pi \cdot a = 4.4$ mm is able to be placed completely inside the afore-described outer contour 207 of the circular area. The action function of the gearing may be provided if the following geometrical criterion is satisfied: According to the number n of homopolar permanent magnets 201 of output gear 200, an n-gon having an edge length of $2 \cdot \pi \cdot a$ is formed. This n-gon may be placed on the circular area (each corner onto a permanent magnet 201) such that it comes to be completely inside outer contour 207 of the circular area.

Analogous relationships with respect to the above statements apply when the antipolar operative connection is examined. Accordingly, second permanent magnet 102 of drive gear 100 is also arranged along a one-gear spiral line. Its south pole interacts with the eight north poles of permanent magnets 202 of output gear 200. The reduction ratio between permanent magnet 102, which is aligned along a one-gear spiral line, and the eight corresponding permanent magnets 202 of output gear 200 is thus 8:1 as well.

This additional operative connection may therefore not result in a change of the reduction ratio with respect to the afore-described force transmission between permanent magnets 101 and 201. It may merely serve to increase the force yield or to increase the transmittable torque since permanent magnets 101 and 102, in interaction with permanent magnets 201 and 202, work virtually in parallel with one another. In particular when the gearing is to be used in rotary encoders, this parallel method of operation of north-pole and south-pole couplings may be provided since the danger of an asynchronous operation, i.e., slippage between drive gear 100 and output gear 200, should be avoided within the meaning of a precise measurement.

Using the gearing as described herein may allow the required torque to be transmitted without any contact whatsoever. However, to safeguard against possible asynchronous, i.e., slip-encumbered, operating states, the non-magnetic driving pins 204 of aluminum are additionally used in output gear 200 in the example illustrated. Instead of aluminum, some other non-magnetic material such as brass or bronze, but also a plastic such as PTFE or PA, etc., may be used as well. Furthermore, as mentioned earlier, driving pins 204 may be magnetized as well and thus may be made of a magnetic material. These driving pins 204 are provided to move output gear 200 in a synchronous and non-slip manner with respect to drive gear 100 even if the power coupling via permanent magnets 101, 102, 201, 202 should no longer be sufficient to transmit the torque. This danger may arise for example when torque spikes occur in high angular accelerations, but also in the presence of an interference magnetic field or when vibrations occur. Plate 104 may ensure that the driving pins will not contact permanent magnets 101, 102 of drive gear 100 since driving pins 204 have such short dimensions that they do not reach permanent magnets 101, 102. In the event that the occurring torque is so great that driving pins 204 come to have an effect, the contacting force transmission occurs between driving pins 204 and plate 104. Possible wear of permanent magnets 101, 102 may be avoided in this manner.

As mentioned previously already, driving pins 204 are magnetized in the exemplary embodiment illustrated in FIG. 2e. In this case, a torque may already be transmitted even without contact or at reduced contact pressure at plate 104 or at permanent magnets 101, 102.

Furthermore, wear of a gearing according to the described example may be negligible since a contactless force transmission takes place during normal operation.

As an alternative to the described exemplary embodiment, plate 104 may also be omitted. In this case, the edges of permanent magnets 101, 102 of drive gear 100 may be provided with a hard material layer, or composites may be used.

Figure 3C:
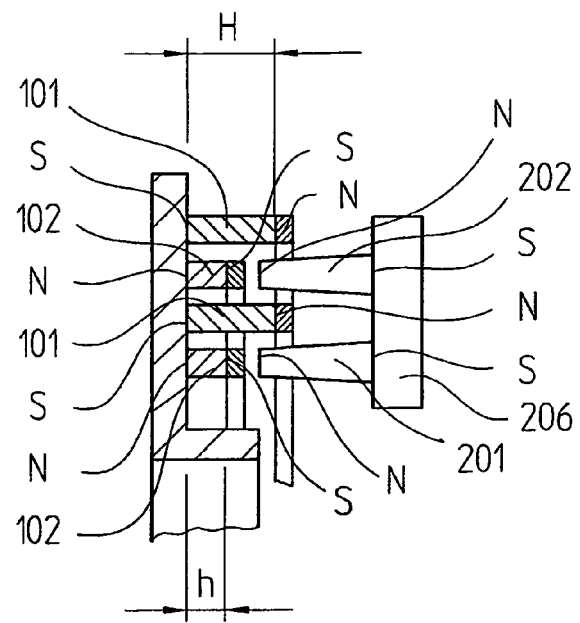
FIG. 3c a side view with a partial section of the drive gear with permanent magnets having different bar height, and with partial output gear.

FIG. 3c illustrates another exemplary embodiment, which is distinguished in that permanent magnets 101, 102 have different bar heights H, h. In this case, permanent magnets 201, 202 engage between permanent magnets 101, 102 without making contact with the magnets during normal operation of the gearing. A corresponding force is transmitted by the attractive and repulsive forces of permanent magnets 101, 102 of drive gear 100 and permanent magnets 201, 202 of output gear 200. In the event that the gearing is subjected to excessive stress, a force is mechanically transmitted via contact with permanent magnets 101, 102, 201, 202. To reduce wear for this emergency operation, appropriate hard material coatings are provided here. This function is also aided by the conical shape of permanent magnets 201, 202 of output gear 200.

Other geometric forms, which deviate from a cylindrical form, may also be selected for driving pins 204 of the other exemplary embodiments, for example, to improve the emergency-running properties.

Figure 3D:
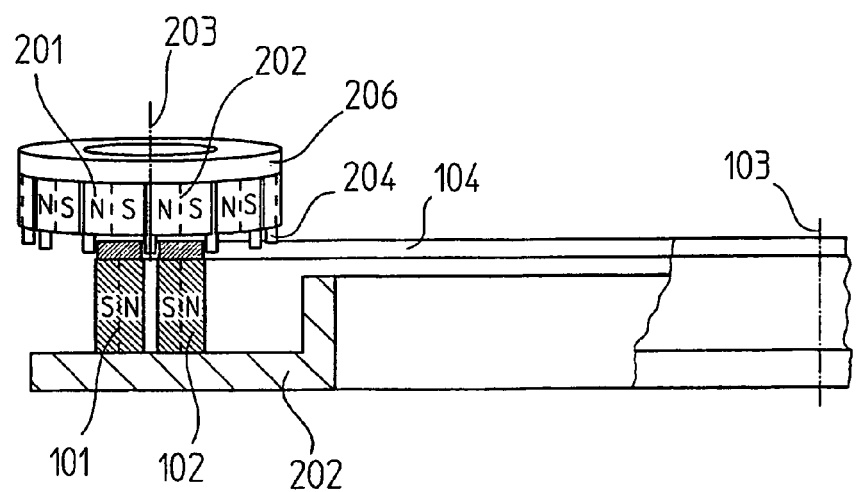
FIG. 3d is a partial view of the gearing having permanent magnets magnetized in the circumferential direction.

FIG. 3d illustrates an additional exemplary embodiment of the gearing in which permanent magnets 101, 102 are magnetized in the radial direction and permanent magnets 201, 202 are magnetized in the circumferential direction. Accordingly, in each case four magnetic poles are arranged opposite each other per permanent magnet 101, 102, 201, 202 in the gearing. In the case of a relative displacement between permanent magnets 101, 102 of drive gear 100 and permanent magnets 201, 202 of output gear 200 as a result of the torque to be transmitted, the magnetic forces of the poles will counteract this displacement, thereby resulting in a relatively stiff power-transmission characteristic of the gearing.

Figure 3E:
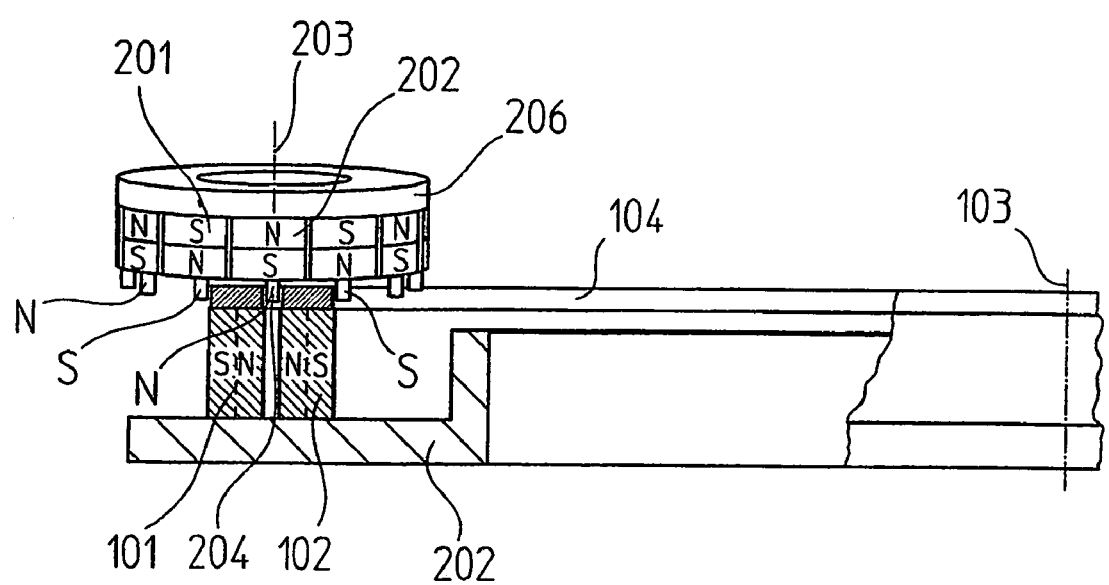
FIG. 3e is a partial view of the gearing with permanent magnets magnetized in the circumferential direction, in combination with permanent magnets magnetized in the radial direction.

In an additional example embodiment of the gearing, permanent magnets 101, 102 illustrated in FIG. 3e may be magnetized in the radial direction, as in the previous exemplary embodiment, but such that poles of the same type are arranged opposite one another. In the example illustrated, the north pole of permanent magnet 101 is arranged across from the north pole of permanent magnet 102. In contrast, permanent magnets 201, 202 of output gear 200 are magnetized in the axial direction. Furthermore, analogously to FIG. 2e, driving pins 204 are magnetized as well, e.g., such that the north pole of a driving pin 204 projects between the two north poles of permanent magnets 101, 102 of drive gear 100. During operation, the south pole of permanent magnet 202 of output gear 200 is thus attracted by the two north poles of permanent magnets 101, 102, so that the system strives for the shortest distance between the poles having different polarization. This function is aided by the repelling forces between the north pole of driving pin 204 and the north poles of permanent magnets 101, 102. In this arrangement, driving pins 204 may thus contribute to the centering of output gear 200 relative to permanent magnets 101, 102 of drive gear 100 and may ultimately lead to an increase in the torque transmittable in a contactless manner.

Figure 4:
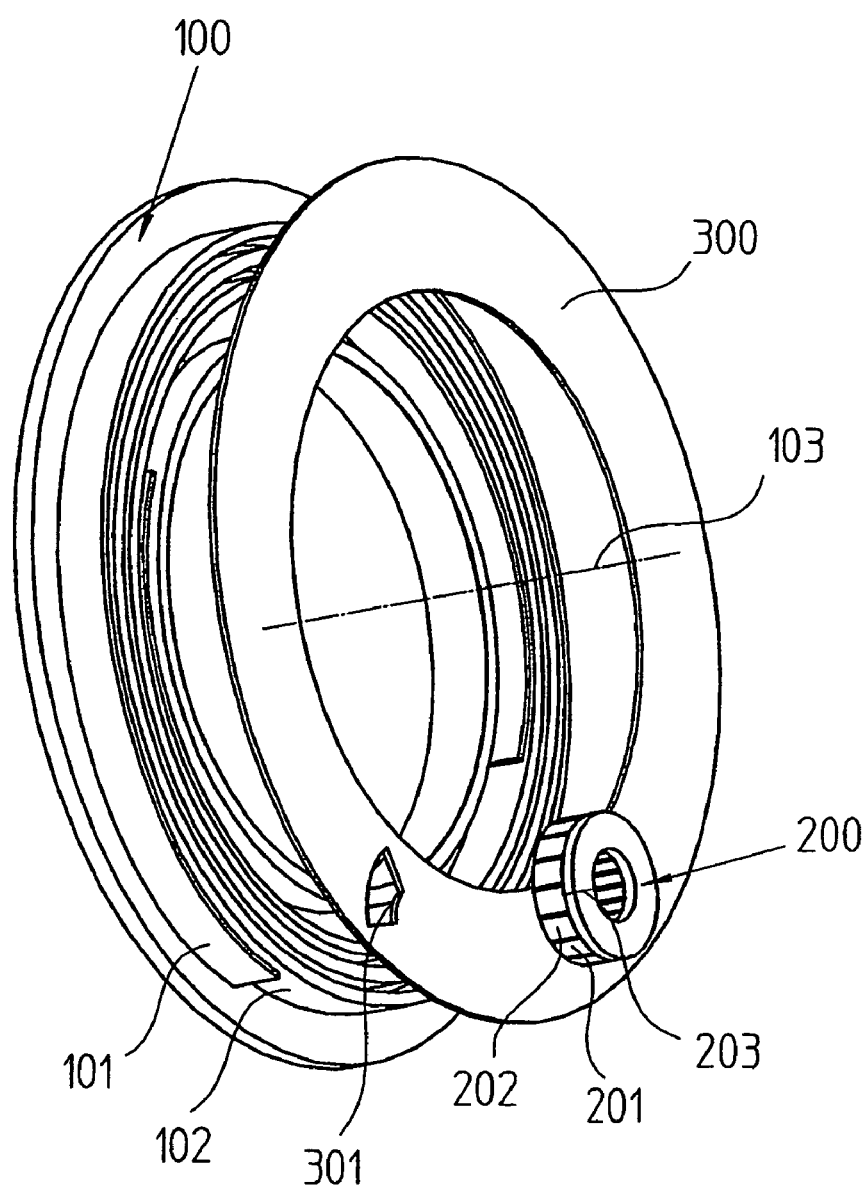
FIG. 4 is a perspective exploded view of the output gear with permanent magnets and shielding plate.
Figure 5A:
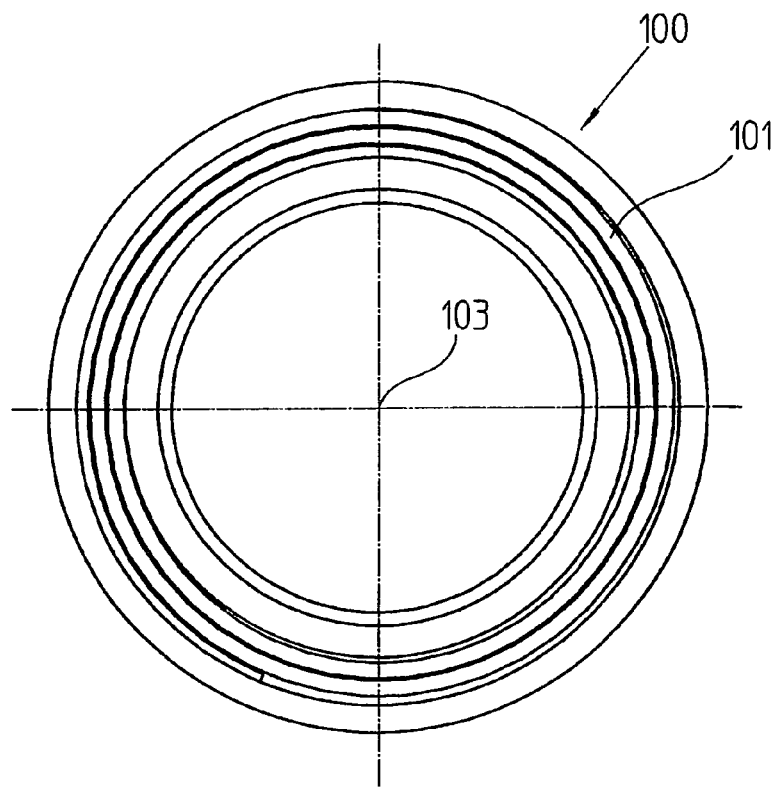
FIG. 5a is a plan view of the drive gear having grooves.
Figure 5B:
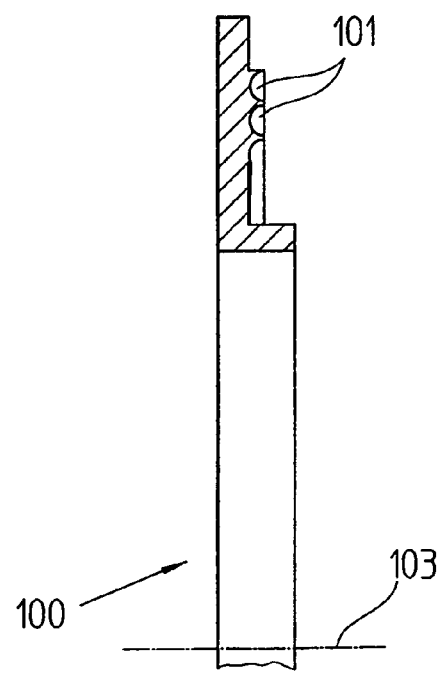
FIG. 5b is a side view with a partial section of the drive gear having grooves.

FIG. 4 illustrates an additional exemplary embodiment in which the force transmission is performed via permanent magnets 101, 102, 201, 202. However, in this case an arrangement is selected in which axes of rotation 103, 203 of drive gear 100 and output gear 200 are aligned in parallel. This may be advantageous, for example, for the subsequent gear steps since it may allow the axes of all gear wheels to be aligned in parallel with respect to axis of rotation 103, so that no bevel-gear step or similar device may need to be used.

The parallel alignment of axes of rotation 103, 203 may be made possible by a screening plate 300 into which a window 301 is introduced. Screening plate 300 is also made of a NiFe alloy having comparatively high relative permeability, which has the property of significantly weakening magnetic fields. As an alternative, it is also possible to utilize an SiFe alloy or amorphous or nanocrystalline alloys, etc., having high relative permeability. In this manner, the magnetic coupling between drive gear 100 and output gear 200 may spatially be limited to the area of window 301. The remaining area of output gear 200 is magnetically insulated to a large extent by screening plate 300, so that the transmittable torque is virtually zero in this region.

As an alternative to a circumferential annular shape of screening plate 300, it is also possible to select only a ring-segment form which covers only the relevant effective area.

A system illustrated in FIGS. 5a to 6c is described in the following as an exemplary embodiment in which the force-transmission element of drive gear 100 is a groove 101 aligned along a spiral line. Balls 208, which are stored in a ball cage 201 of output gear 200, engage with this groove 101. As illustrated in FIG. 6b, ball cage 201 is arranged such that, on the one hand, balls 208 are able to rotate freely therein about all axes and are axially secured against falling out, on the other hand. In the illustrated example, ball cage 201 or entire output gear 200 is made of plastic, so that balls 208 may be installed in ball cage 201 by snapping into place.

Figure 6A:
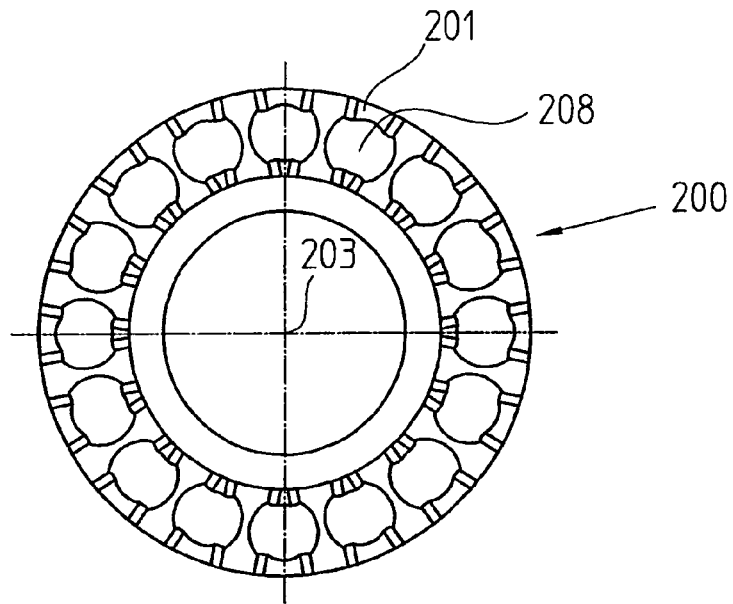
FIG. 6a is a plan view of the drive gear with balls in a ball cage.
Figure 6B:
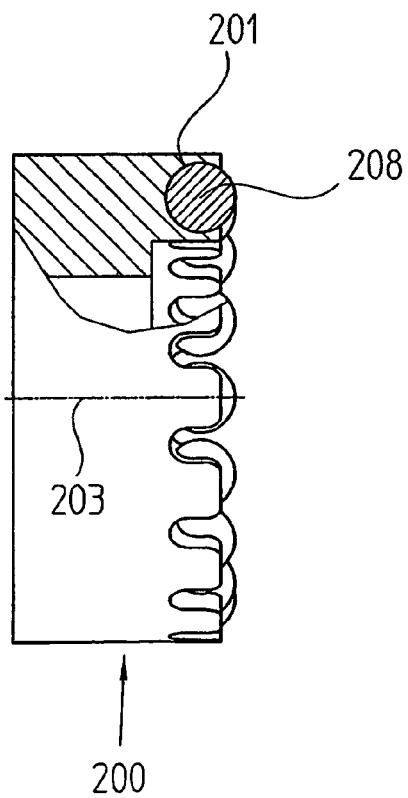
FIG. 6b is a side view with a partial section of the drive gear with balls in a ball cage.
Figure 6C:
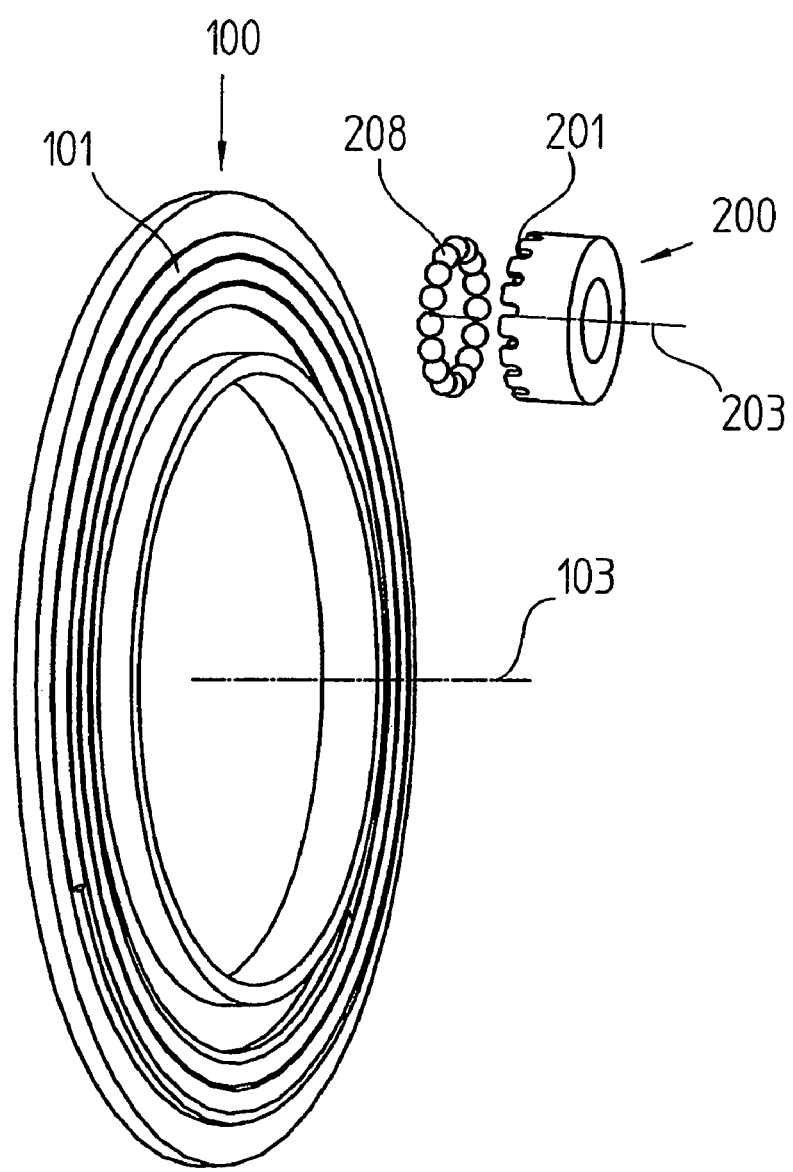
FIG. 6c is a perspective exploded view of the output gear with a ball cage and balls.

As illustrated in FIG. 6a, output gear 200 has sixteen balls 208, which interact with a groove 101 (single-gear spiral). On the basis of this information the reduction ratio of 16:1 may be determined.

In this exemplary embodiment, axis of rotation 103 of drive gear 100 is tilted with respect to axis of rotation 203 of output gear 200 in the assembled state. In contrast to the exemplary embodiments illustrating contactless force transmission, there are friction losses and wear in this example of a contacting force-transmission device. These effects may be reduced by lubricating the gearing and by using suitable material pairings. Wear may be reduced in that the rolling partners, e.g., groove 101, balls 208 and ball cage 201, are provided with a wear-reducing hard-material coating such as a tungsten-carbide layer in combination with slideable plastics, such coating being applied to all or some of the mentioned components. Ball cage 201 may be manufactured from sintered metal with incorporated lubricants. As an alternative, balls 208 and/or the other rolling partner may be made of a ceramic material.

As illustrated in FIG. 7, the gearing is installed in a multi-turn rotary encoder 400 for ascertaining the absolute angular position. Via its large central bore, drive gear 100 of the gearing is connected to a hollow shaft 401 of rotary encoder 400 in a rotatably fixed manner. Hollow shaft 401 holds a shaft in a rotatably fixed manner, the rotational position of which is to be measured during operation of rotary encoder 400. Mounted at a shoulder of hollow shaft 401 is a code disk 402, which is bonded in this example, so that during measuring operation code disk 402 rotates with the same frequency as hollow shaft 401. To record the absolute position within one rotation of hollow shaft 401, code disk 402 carries a multi-track code, e.g., a Gray code, the finest track being a high-resolution incremental track which may be positioned as far as possible outside at the periphery of code disk 402, to permit the arrangement of as many graduation periods as possible over the periphery. The more graduation periods are disposed across the entire circumference, the higher the angular resolution of the rotary encoder to be detected.

Positioned in non-rotating housing 410 of rotary encoder 400 are a light source 411, a lens 412 and a scanning plate 413. Furthermore, a wafer 414 on the underside of which photodetectors are affixed, is joined to housing 410 in a rotatably fixed manner. With the aid of this optical angle scanner the individual angular position within one rotation of hollow shaft 410 is determined in an incremental and/or absolute manner.

A multiturn measurement may require the gearing and the additional gear steps cooperating therewith. These are integrated in a gear box 420, the outer wall of which is partially omitted in FIG. 7 for clarity. Gear box 420 is joined to housing 410 in a rotatably fixed manner and thus does not participate in the rotary motion of hollow shaft 401 or drive gear 100. In contrast, axis of rotation 203 of output gear 200 is immoveable also with respect to gear box 420 and thus with respect to housing 410. Drive gear 100, in a slip-free manner and at the given reduction, transmits the rotary motion of hollow shaft 401 to output gear 200, which is supported in bearing P so as to allow rotation about axis of rotation 203 relative to gear box 420. A gear wheel, which meshes with a gear wheel of an additional reduction step, is connected to output gear 200 in a rotatably fixed manner. Mounted on the shaft of this additional reduction step is a graduated disk 421 having magnetic graduation. Furthermore, additional gear steps having further graduated disks 422 and 423 are arranged accordingly. The axes of rotation of graduated disks 421, 422, 423 are aligned in parallel with hollow shaft 401. Each graduated disk 421, 422, 423 is made up of a magnetic body having magnetic poles (north, south) arranged by turns in the circumferential direction. In the simplest case, graduated disks 421, 422, 423 each take the form of short bar magnets having a single north pole and south pole. The magnetic graduations of graduated disks 421, 422, 423 are arranged in a common plane.

In this example, graduated disk 421 rotates more slowly than hollow shaft 401 by a factor of 16, the additional gear steps leading to a further reduction of the rotational frequencies of corresponding graduated disks 422, 423.

Via detector devices at the upper side of wafer 414, which are Hall sensors in this case, the angular positions of graduated disks 421, 422, 423 are determined. Graduated disks 421, 422, 423 thus measure the number of rotations of hollow shaft 401, each graduated disk 421, 422, 423 being driven in a geared-down manner via the reduction gear by the particular gear step connected upstream. For a space-saving design, graduated disks 421, 422, 423 as well as pivot bearing P of axis of rotation 203 of output gear 200 are arranged within the peripheral region of code disk 402.

Instead of Hall sensors, it is also possible to use magneto-resistive sensors such as AMR, GMR (giant magneto-resistive) or TMR sensors (tunnel magneto-resistive), etc., as detector devices.

Output gear 200 is installed between drive gear 100 and wafer 414 in the described example. Because of this configuration and due to the fact that the magnetic graduations of graduated disks 421, 422, 423 are arranged in one plane, it may be relatively easy to accommodate the associated detector devices on the upper face of wafer 414. As described above, the corresponding photodetectors are affixed to the underside of wafer 414. Both sides of wafer 414 may be fitted with electronic components, which may provide certain advantages with respect to the required space and also the production economy.

The components of the optical scanner (e.g., light source 411, lens 412, sampling plate 413 and code disk 402) are thus situated underneath wafer 414 in rotary encoder 400 illustrated in FIG. 7, the photoelements being affixed to the underside of wafer 414. Mounted on the upper face of wafer 414 are, among others, the detector devices for recording the rotational positions of graduated disks 421, 422, 423. As illustrated in FIG. 7, the gearing and the additional gear steps are mounted above the wafer. Output gear 200, which similar to drive gear 100 is part of the novel gearing, does not project beyond the outer diameter of housing 410. In this case, it is possible to use a housing 410 of a conventional rotary encoder since, compared to earlier gearings, the gearing may not enlarge the radial dimensions of rotary encoder 400. Disposed above output gear 200 is drive gear 100 of the gearing, which is dimensioned such that its diameter is not greater than that of housing 410. Due to the described arrangement, it is therefore possible to produce a rotary encoder 400 which may have exceedingly small structural dimensions both in the radial and the axial direction and may be equipped with a gearing that may have the already described advantages.

As mentioned previously, it may be provided in the described configuration that output gear 200 is arranged such that it does not project, or projects to only a negligible degree, beyond the outer diameter of body 106 of drive gear 100. In other words, the clearance between bearing P and axis of rotation 103 of the drive gear is not greater than one-half of the outer diameter of body 106 of drive gear 100. In the example illustrated, the clearance between bearing P and axis of rotation 103 of the drive gear is also not greater than one-half of the outer diameter of code disk 402. In the event that two or more bearings P are provided in which axis of rotation 203 of output gear 200 is supported, the particular bearing P having the shortest clearance with respect to axis of rotation 103 may be considered in this examination, provided axis of rotation 203 of output gear 200 is arranged in a correspondingly inclined manner with respect to axis of rotation 103 of drive gear 100. As a result of satisfying these criteria, the arrangement of the rotary encoders may have a relatively small diameter.

The use of the gearing is not limited to rotary encoders whose incremental scanning is based on an optical principle or whose counting of rotations is based on a magnetic scanning principle. It also covers, among others, rotary encoders having a capacitive or an inductive effect.

What is claimed is:

1. A gearing, comprising:
   a rotatable drive element;
   a rotatable output element;
   at least one first force-transmission device arranged at an end face of the drive element along at least one spiral line; and
   a second force-transmission device arranged at an end face of the output element along a circumferential line;
   wherein in accordance with reciprocal action of the first force-transmission device and the second force-transmission device, the first force-transmission device and the second force-transmission device are configured to transmit torque from the drive element to the output element to effect a rotary motion in the output element, a frequency of rotation of the output element lower than a frequency of rotation of the drive element.

2. The gearing according to claim 1, wherein the spiral line satisfies the condition $r=a\cdot\phi$, r representing a radius of the spiral line, a representing a constant positive number, and $\phi$ representing a pivoting angle of a radial beam originating from a pole of the spiral line.

3. The gearing according to claim 1, wherein a total number of reciprocating elements of the second force-transmission device is greater than an effective number of threads of the spiral line of the drive element.

4. The gearing according to claim 1, wherein a greatest distance between an axis of rotation of the output element and an outer contour of the second force-transmission device of the output element is smaller than a distance between axes of rotation of the drive element and the output element in a region of the output element.

5. The gearing according to claim 1, wherein at least one of (a) the first force-transmission device and (b) the second force-transmission device includes a permanent magnet.

6. The gearing according to claim 5, wherein the force-transmission devices are configured to transmit the torque in a contactless manner.

7. The gearing according to claim 5, wherein the force-transmission devices are configured to transmit the torque in a contactless manner by repelling magnetic forces.

8. The gearing according to claim 5, wherein the permanent magnets are arranged on a carrier body, a material of the carrier body having a relative permeability greater than 10.

9. The gearing according to claim 5, wherein the permanent magnets are arranged on a carrier body, a material of the carrier body having a relative permeability greater than 100.

10. The gearing according to claim 5, wherein at least one permanent magnet of the drive element includes a layer on a side facing the output element, the layer including a ferromagnetic material.

11. The gearing according to claim 5, wherein permanent magnets of the drive element are arranged on a plurality of spiral lines and have different bar heights.

12. The gearing according to claim 5, further comprising a third force-transmission device configured to transmit torque in a contacting manner from the drive element to the output element.

13. The gearing according to claim 12, wherein the third force-transmission device is configured to transmit torque in both the contacting manner and a non-contacting manner from the drive element to the output element.

14. The gearing according to claim 12, wherein the third force-transmission device includes one of a set of driving pins located on the output element and a set of rotatable balls located on the output element.

15. The gearing according to claim 5, further comprising a third force-transmission device at the output element configured to transmit torque in a contacting manner from the drive element to the output element.

16. The gearing according to claim 5, wherein a magnetically screened partial region and a non-screened partial region are located in a region between the drive element and the output element.

17. The gearing according to claim 16, wherein the magnetically screened partial region includes a ferromagnet, and the non-screened partial region includes a window in the ferromagnet.

18. The gearing according to claim 16, wherein the magnetically screened partial region includes a soft magnetic plate, and the non-screened partial region includes a window in the plate.

19. The gearing according to claim 1, wherein the first force-transmission device of the drive element includes a groove, and the second force-transmission device of the output element includes recesses in which ball elements are arranged.

20. The gearing according to claim 1, wherein the second force-transmission device includes a plurality of permanent magnets arranged along the circumferential line, each permanent magnet having a polarity opposite to a polarity of adjacent permanent magnets, at least a portion of each permanent magnet having a height from the end face of the output element different than a height of at least a portion of adjacent permanent magnets.

21. The gearing according to claim 1, wherein each first force-transmission device is spiral shaped.

22. The gearing according to claim 1, wherein the frequency of rotation of the output element is fixed in proportion to the frequency of rotation of the drive element.

23. The gearing according to claim 1, wherein an axis of rotation of the drive element is one of parallel to and at a slightly inclined angle to an axis of rotation of the output element.

24. A rotary encoder, comprising:
   at least one gear step, each gear step including:
      a rotatable drive element;
      a rotatable output element;
      at least one first force-transmission device arranged at an end face of the drive element along at least one spiral line; and
      a second force-transmission device arranged at an end face of the output element along a circumferential line;
   wherein in accordance with reciprocal action of the first force-transmission device and the second force-transmission device, the first transmission device and the second transmission device are configured to transmit torque from the drive element to the output element to effect a rotary motion in the output element, a frequency of rotation of the output element lower than a frequency of rotation of the drive element.

25. The rotary encoder according to claim 24, wherein the output element is arranged between the drive element and a wafer.

26. The rotary encoder according to claim 24, wherein a shortest distance between an axis of rotation of the drive element and a point at which the output element is rotatably supported is not greater than one-half of a diameter of a body of the drive element.

27. The rotary encoder according to claim 24, wherein a shortest distance between an axis of rotation of the drive element and a point at which the output element is rotatably supported is not greater than one-half of a diameter of a code disk.

28. The rotary encoder according to claim 24, wherein the second force-transmission device includes a plurality of permanent magnets arranged along the circumferential line, each permanent magnet having a polarity opposite to a polarity of adjacent permanent magnets, at least a portion of each permanent magnet having a height from the end face of the output element different than at least a portion of adjacent permanent magnets.

29. The rotary encoder according to claim 24, wherein each first force-transmission device is spiral shaped.

30. The rotary encoder according to claim 24, wherein the frequency of rotation of the output element is fixed in proportion to the frequency of rotation of the drive element.

31. The rotary encoder according to claim 24, wherein an axis of rotation of the drive element is one of parallel to and at a slightly inclined angle to an axis of rotation of the output element.

32. A gearing, comprising:
rotatable drive means;
rotatable output means;
at least one first force-transmission means arranged at an end face of the drive means along at least one spiral line; and
second force-transmission means arranged at an end face of the output means along a circumferential line;
wherein in accordance with reciprocal action of the first force-transmission means and the second force-transmission means, the first force-transmission means and the second force-transmission means transmit torque from the drive means to the output means to effect a rotary motion in the output means, a frequency of rotation of the output means lower than a frequency of rotation of the drive means.

33. The gearing according to claim 32, wherein each first force-transmission means is spiral shaped.

34. The gearing according to claim 32, wherein the frequency of rotation of the output means is fixed in proportion to the frequency of rotation of the drive means.

35. The gearing according to claim 32, wherein an axis of rotation of the drive means is one of parallel to and at a slightly inclined angle to an axis of rotation of the output means.

36. A rotary encoder, comprising:
at least one gear step, each gear step including:
rotatable drive means;
rotatable output means;
at least one first force-transmission means arranged at an end face of the drive means along at least one spiral line; and
second force-transmission means arranged at an end face of the output means along a circumferential line;
wherein in accordance with reciprocal action of the first force-transmission means and the second force-transmission means, the first force-transmission means and the second force-transmission means transmit torque from the drive means to the output means to effect a rotary motion in the output means, a frequency of rotation of the output means lower than a frequency of rotation of the drive means.

37. The rotary encoder according to claim 36, wherein each first force-transmission means is spiral shaped.

38. The rotary encoder according to claim 36, wherein the frequency of rotation of the output means is fixed in proportion to the frequency of rotation of the drive means.

39. The rotary encoder according to claim 36, wherein an axis of rotation of the drive means is one of parallel to and at a slightly inclined angle to an axis of rotation of the output means.

* * * * *